Feb. 19, 1924.
C. F. GOLDEN
1,483,935
DRAFTING INSTRUMENT
Filed Dec. 20, 1921     2 Sheets-Sheet 1
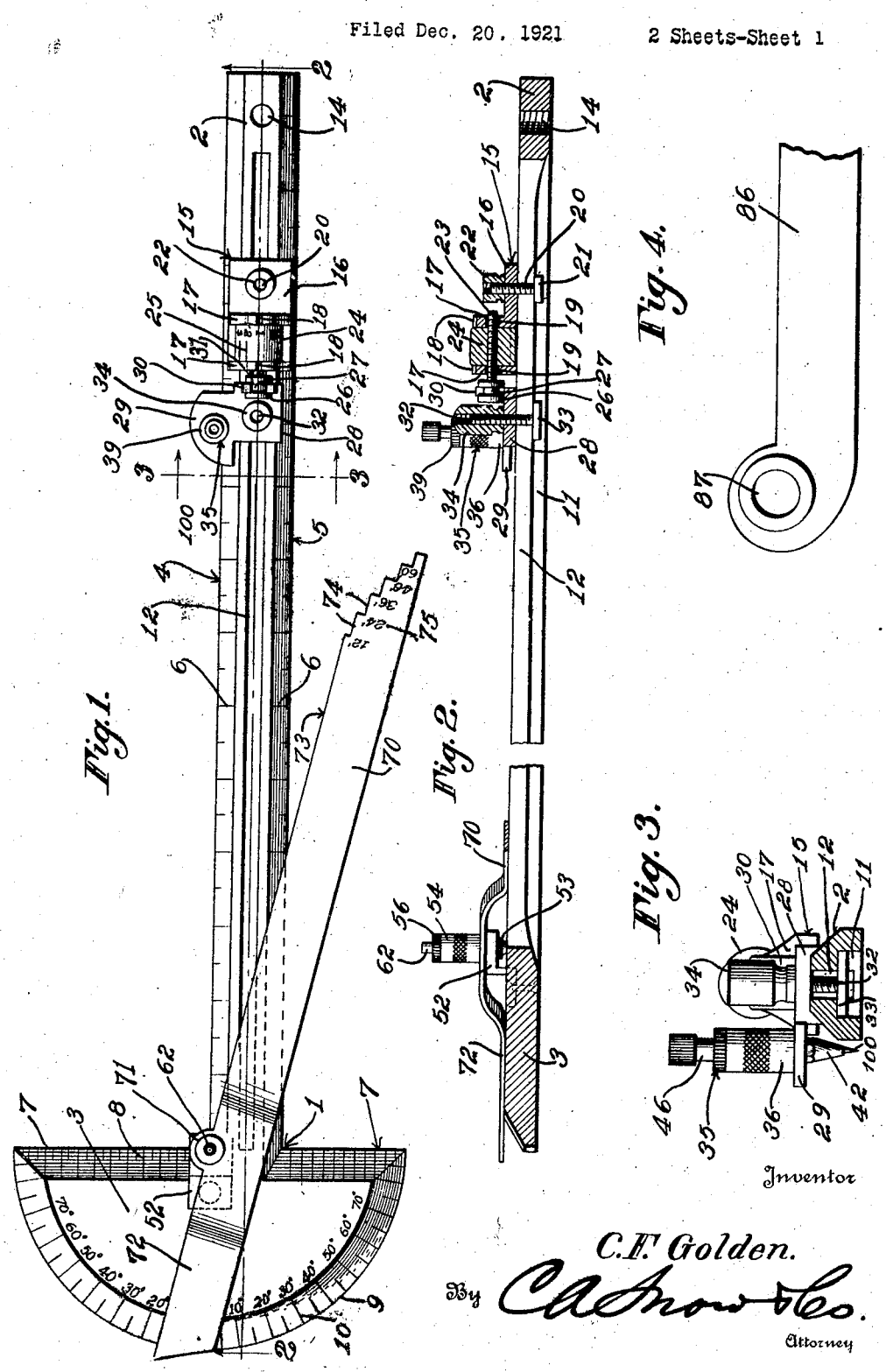
Inventor
C. F. Golden.
By C. A. Snow & Co.
Attorney Feb. 19, 1924.
C. F. GOLDEN
1,483,935
DRAFTING INSTRUMENT
Filed Dec. 20, 1921
2 Sheets-Sheet 2
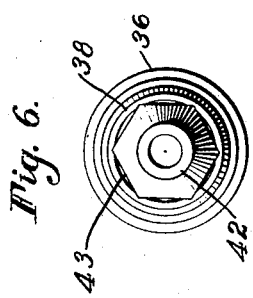
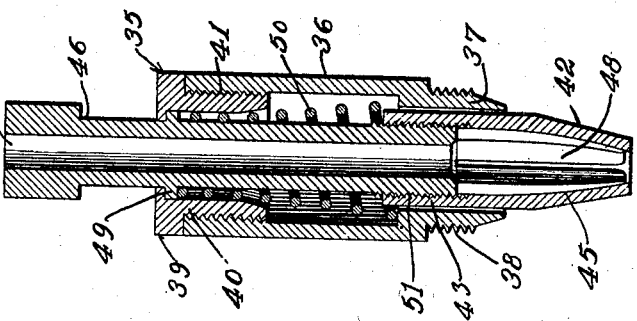
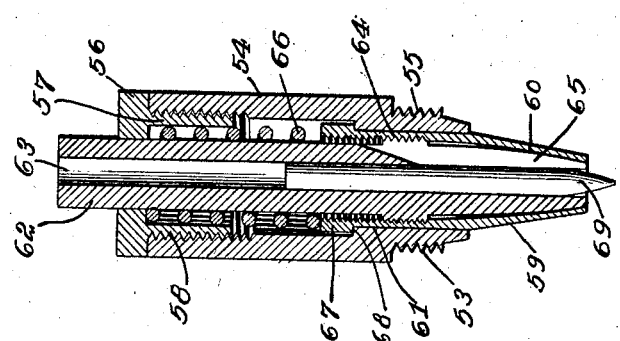
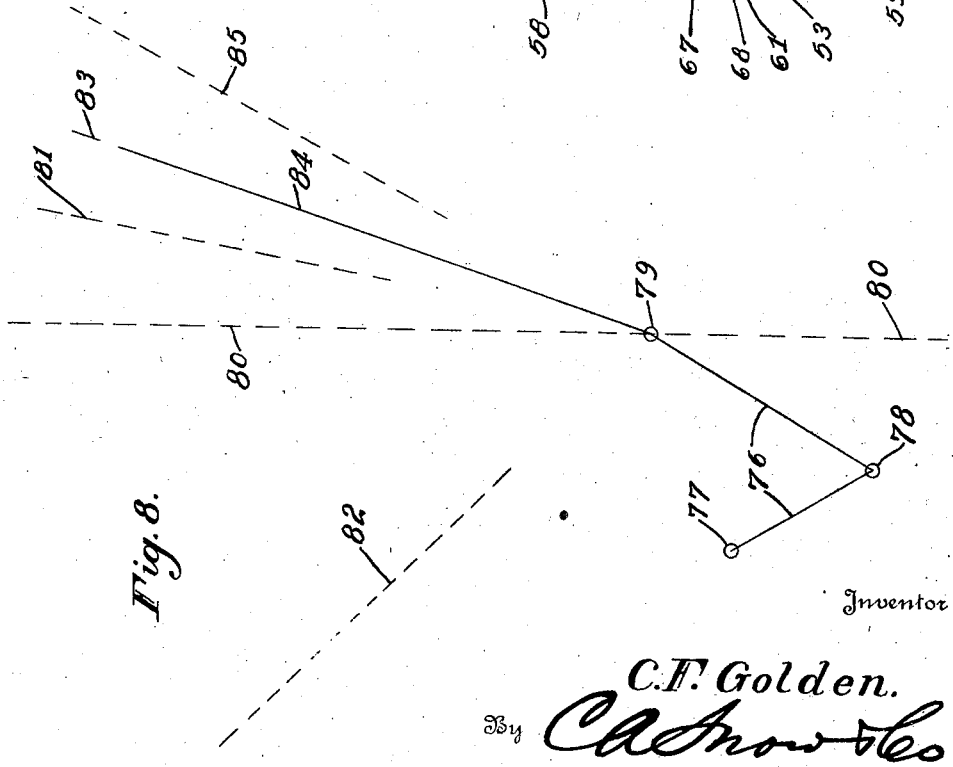
Inventor
C.F. Golden.
By C.A.Snow & Co.
Attorney Patented Feb. 19, 1924.

1,483,935

UNITED STATES PATENT OFFICE.

CHARLES FREMONT GOLDEN, OF DENVER, INDIANA.

DRAFTING INSTRUMENT.

Application filed December 20, 1921. Serial No. 523,731.

*To all whom it may concern:*

Be it known that I, CHARLES FREMONT GOLDEN, a citizen of the United States, residing at Denver, in the county of Miami and State of Indiana, have invented a new and useful Drafting Instrument, of which the following is a specification.

This invention aims to provide a novel form of drafting instrument, adapted to be used for drawing circles, for measuring and plotting angles, for laying down traverse courses and the like.

The invention aims, further, to provide novel means whereby a micrometric reading may be obtained.

Other objects are, to provide novel means for mounting the stylus, to provide novel means for mounting the center point, and to provide novel means whereby angles may be read off in groups of minutes, as distinguished from degrees.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in plan, a tool constructed in accordance with the invention; Figure 2 is a longitudinal section taken on the line 2—2 of Figure 1; Figure 3 is a cross section on the line 3—3 of Figure 1; Figure 4 is a fragmental elevation showing a modified form of arm; Figure 5 is a longitudinal section taken through the stylus holder; Figure 6 is an end elevation of the structure shown in Figure 5; Figure 7 is a longitudinal section taken through the center point holder; Figure 8 is a diagram illustrating certain uses of the tool. The tool forming the subject matter of this invention may be made of any desired material, and comprises a main member denoted generally by the numeral 1, the main member being made up of a body 2 and a transverse head 3 which may be in the form of a protractor. The fiducial edges of the body 2 are designated by the reference numerals 4 and 5, the body being provided, adjacent to the edges 4 and 5, with scales 6 which may be made in any desired way, no specific form of scale being shown, because I am aware of the fact that the scales may be made in any preferred way, no novelty resulting, as a general statement, from the use of any known form of scale. The straight edge 7 of the head 3 is located at right angles to the edges 4 and 5 of the body 2, to facilitate the laying off of right angles. The head 3 is supplied, adjacent to the edge 7 with a scale 8, which may be constructed in accordance with the taste of the user or manufacturer. The curved edge 9 of the head 3 constitutes the usual element of a protractor, and is supplied with a degree scale 10, reading in opposite directions from a zero point, the zero point preferably being in a line with the edge 4 of the body 3. On its under side, the body 2 has a longitudinal groove 11. The body 2 has a longitudinal slot 12, communicating with the groove 11. A threaded opening 14 is formed in that end of the body 2 which is remote from the head 3.

The numeral 15 denotes, generally, a carriage, mounted for adjustment on the body 2, longitudinally thereof, the carriage including a base plate 16 resting on the body 2 and having upstanding flanges 17 provided with indices 18. Openings 19 are fashioned in the flanges 17. A screw 20 extends upwardly through the slot 12 of the body 2 and through the base plate 16 of the carriage 15, the head 21 of the screw being housed in the groove 11 and bearing against the body 2. A nut 22 is threaded on the screw 20 and is adapted to engage the base plate 16 of the carriage 15, the screw and the nut constituting a clamping device for holding the carriage 15 in adjusted positions on the body 2 longitudinally of the body. A micrometer screw 23 is mounted loosely in the openings 19 of the flanges 17. A micrometer nut 24 is threaded on the screw 23 and is disposed between the flanges 17, the micrometer nut having a circumferential scale 25, adapted to cooperate with the indices 18 on the flanges 17. At its forward end the micrometer screw 23 is supplied with an enlarged head 26 having a circumferential groove 27. The numeral 28 designates a rider, mounted on the body 2 for adjustment longitudinally of the body, the rider being provided with a laterally extended wing 29. The rider 28 has an upstanding flange 30, supplied with a notch or seat 31 receiving the grooved portion 27 of the head 26 of the micrometer screw 24, the micrometer screw thus being connected with the rider 28, for rotation, but against longitudinal movement independently of the rider. A screw 32 extends upwardly through the slot 12 of the body 2, and through the rider 28, the screw having a head 33, located in the groove 11 of the body 2 and engaging the body. A nut 34 is threaded on the upper end of the screw 32 and bears upon the rider 28, the screw and the nut constituting a clamping means for holding the rider in adjusted positions on the body 2; longitudinally of the body.

The rider 28 carries a stylus holder 35, which is a composite structure. The stylus holder comprises a casing 36, having a reduced neck 37 which is threaded at 38 into the wing 29 of the rider 28. The casing 36 is surmounted by a cap 39 provided with a reduced neck 40 which is threaded at 41 into the casing 36. The numeral 42 denotes a a tip, including a body 43 which is polygonal in cross section, the body 43 of the tip 42 being disposed in the neck 37 of the casing 36. As shown in Figure 5, the neck 37 is provided with internal longitudinal grooves, denoted by the numeral 44, and receiving the longitudinal edges formed by the angles 43 of the tip 42, the construction being such, that, although the tip 42 can move longitudinally of the neck 37, the tip cannot rotate with respect to the neck. The tip 42 has a tapered bore 45. A hollow plunger 46 is mounted for reciprocation in the cap 39 and has a bore 47. At its lower end the plunger 46 is supplied with compressible jaws 48, adapted to cooperate with the tapered bore 45 of the tip 42. Adjacent to its upper end, the plunger 46 carries an abutment 49, located within the cap 39 and adapted to cooperate with it, to limit the upward movement of the plunger, under the action of a compression spring 50, surrounding the plunger and located in the casing 36, the lower end of the spring engaging the casing, and the upper end of the spring engaging the abutment 49. The lower end of the plunger 46 is threaded at 51 into the body portion 43 of the tip 42. Since the tip 42 is stilled against rotation in the neck 37 of the casing 36, when the plunger 46 is threaded downwardly, at 51, into the body 43 of the tip 42, the compressible jaws 48 of the plunger, cooperating with the tapered bore 45 of the tip 42, will be compressed about the stylus, the stylus being denoted by the numeral 100. The operator may press down the plunger 46, thereby compressing the spring 50, the stylus 100 being brought into engagement with the paper on which the drawing is to be made. When the plunger 46 is released, the plunger will move upwardly, responsive to the spring 50, the stylus 100 being raised with respect to the paper. Since the bore 47 opens through the upper end of the plunger 46, the stylus 100 may be inserted into the plunger, without separating the constituent parts of the stylus holder 35.

A bracket 52 is mounted on the head 3, and into the bracket 52, the neck 53 of a casing 54 is threaded, the threading appearing at 55 in Figure 7 of the drawings. On the casing 54 is mounted a cap 56, having a reduced neck 57, threaded at 58 into the upper end of the casing. A tip 59 is provided, and has a tapered bore 60, the tip including a polygonal body 61, held for longitudinal sliding movement, but against rotation, in the neck 57, as hereinbefore explained in connection with the tip 42 and its body 43. At its upper end, the body 61 of the tip 59 is provided with an enlargement 67, adapted to cooperate with an internal shoulder 68 in the casing 54, to limit the downward sliding movement of the tip, under the action of a compression spring 66, one end of the spring abutting against the element 67, and the other end of the spring abutting against the cap 56. The spring 66 surrounds a hollow plunger 62 mounted to slide in the cap 56, the plunger having a bore 63 and terminating in compressible jaws 65, adapted to cooperate with the tapered bore 60 of the tip 59. The plunger 62 is threaded at 64 into the body 61 of the tip 59. A center point 69 is located in the bore 63 of the plunger 62. Obviously by threading the plunger 62 downwardly into the body 61 of the tip 59, the jaws 65 of the plunger may be made to cooperate with the tapered bore 60 of the tip 59 and may be made to grip the center point 69. The center point 69 may be inserted downwardly into the position shown in Figure 7, through the bore 63, because the bore opens through the upper ends of the plunger 62. The tip 59, the plunger 62 and the center point 69 normally are depressed by the action of the spring 66, but the operator at any time may pull the plunger 62, the tip 59 and the center point 69 upwardly, the spring 66 being compressed. The center point 69, therefore may be disposed out of engagement with the paper at the will of an operator, thereby enabling the part 69 to be located properly with respect to a point of reference.

The numeral 70 marks an arm, which may be flexible if desired, the arm having an opening 71, whereby the arm may be mounted removably on the casing 54 for swinging movement. The arm 70 has an extension 72 prolonged upon the head or protector 3, and adapted to cooperate with the scale 10 of the protractor. The fiducial edge of the arm 70 is denoted by the numeral 73. At its free end, the arm 70 has edges 74 which are offset, transversely of the arm 70 with respect to the fiducial edge 73 of the arm. The arm 70 is marked, adjacent to the edges 74 as indicated at 75, to indicate fractions of a degree, in minutes or otherwise.

The micrometer nut 24 may be rotated, the carriage 15 being fixed on the body 2, and the rider 28 being slidable on the body. Through the instrumentality of the nut 24 and the micrometer screw 23, a very fine setting for the rider 28 and consequently for the stylus 100, may be provided. By tightening up the nut 34 on the screw 32, the rider 28 may be clamped on the body 2 in any position to which it may have been adjusted. Then, if desired, the nut 22 on the screw 20 may be loosened, so as to permit a new setting of the carriage 15. If desired, the carriage 15 may be removed entirely, and the rider 28 being used alone, since the head 26 of the micrometer screw 23 may be lifted out of the notch or seat 31 of the flange 30 in the wing 29 of the rider 28. The center point 69 is located at the intersection at the edge 4 of the body 2, and the edge 7 of the head 3, and, after the stylus 100 has been set as aforesaid, a circle may be described, with the point 69 as a center. If desired, the casing 54 may be detached from the bracket 32, the neck 53 being threaded into the opening 14 of the body 2, the distance then being measured from the stylus 100 toward the outer end of the body rather than from the stylus toward the head 3.

In a tool of the sort shown in this application, it is not possible to lay down any hard and fast rules relative to the method of procedure, since a device of the sort described ordinarily is committed to persons having their own methods of procedure, and capable of devising such methods as the work in hand demands. The foregoing observation should be borne in mind in connection with what has been stated hereinbefore and in connection with what follows hereinafter.

Reference may be had to Figure 8, as illustrating one of the many uses for which the instrument is adapted. In Figure 8, there is shown an incomplete traverse 76, including stations 77, 78 and 79. Let it be supposed that it is desired to continue the plotting of the traverse, from the station 79. Then, the operator may, if he chooses, proceed in accordance with the following instructions.

Draw a north and south line of reference 80 through the station 79. Place the center point 69 at the station 79. Swing the tool clock-wise, with the center point 69 at the station 79, until the desired degree mark 10 on the protractor 3 coincides with the line 80. Draw a line 81 along the edge 4 of the body 2. The line 81 indicated the azimuth in degrees. Swing the body 2 into an out-of-the way position indicated, for instance, by the line 82. Bring the fiducial edge 73 of the arm 70 to the line 81. Make a mark 83 along one of the offset edges 74 of the arm 70 to denote the number of minutes designated by that particular edge. Bring the edge 4 of the body 2 into coincidence with the mark 83, and draw a line 84 from the station 79 toward the mark 83, the azimuth of the next course in the traverse thus being fixed, whereupon the distance may be laid off on the scale 6 which is adjacent to the edge 4, the rider 28 being used to lay off the distance if a micrometric reading is desired.

Suppose that it is desired to determine the angle between two lines, e. g. the line 80 and a line 85. Then the center point 69 is placed at the station 79, the edge 4 of the body 2 is made to coincide with the line 80, the fiducial edge 73 of the arm 70 is brought into coincidence with the line 85, and the angle is read off in degrees on the scale 10 of the protractor 3, by means of the extension 72 of the arm 70.

In operations which do not call for a reading determined by the relation existing between the arm and the scale 10 of the protractor 3, an arm 86 may be used, the arm having an opening 87 for the reception of the part 54, the extension 72 being omitted. Such an arm as the member 86 may be used to plot the traverse course shown at 84 and hereinbefore described.

Having thus described the invention, what is claimed is:

1. In a tool of the class described, a main member; a center point carried by the main member; a stylus holder; means for mounting the stylus holder on the main member and means for micrometric adjustment of said holder with respect to the center point.

2. In a tool of the class described, a main member; a center point carried by the main member; spring means for advancing the center point; means under the control of an operator for retracting the center point; a stylus holder; means for mounting the stylus holder on the main member and means for micrometric adjustment of said holder with respect to the center point.

3. In a tool of the class described, a main member; a center point carried by the main member; a stylus holder; means for mounting the stylus holder on said main member and for micrometrically adjusting it with respect to the center point; spring means for retracting the stylus in the stylus holder; and means under the control of an operator for advancing the stylus in the stylus holder.

4. In a tool of the class described, a main member; a center point; spring means for advancing the center point on the main member; mechanism under the control of an operator for retracting the center point on the main member; a stylus holder; means for mounting the stylus holder on the main member, means for micrometric adjustment of said holder with respect to the center point; spring means for retracting a stylus in the stylus holder; and mechanism under the control of an operator for advancing a stylus in the stylus holder.

5. In a device of the class described, a main member; a carriage adjustable on the main member; a rider adjustable on the main member; a stylus holder carried by the rider; a micrometer mechanism forming a connection between the carriage and the rider; means for holding the carriage in adjusted positions on the main member; and means for holding the rider in adjusted positions on the main member.

6. In a device of the class described, a main member, a stylus holder adjustable on said member, micrometer mechanism adjustable on said member and connected with said holder, means for holding said mechanism in adjusted position on said member, and means for holding the holding means in adjusted position.

In testimony that I claim the foregoing as my own, I have hereto affixed my signature in the presence of two witnesses.

CHARLES FREMONT GOLDEN.

Witnesses:
   J. W. NEWELL,
   CHAS. O. TOMHOOF.